US005812209A

United States Patent [19]

Nishigaki

[11] Patent Number: 5,812,209

[45] Date of Patent: Sep. 22, 1998

[54] TELEVISION DEVICE

[75] Inventor: Tetsuo Nishigaki, Kanagawa, Japan

[73] Assignee: Sony Corporation, Tokyo, Japan

[21] Appl. No.: 595,166

[22] Filed: Feb. 1, 1996

[30] Foreign Application Priority Data

Feb. 3, 1995 [JP] Japan .................................... 7-039248

[51] Int. Cl.[6] ........................................................ H04N 7/00

[52] U.S. Cl. .......................... 348/553; 348/461; 348/468; 348/473; 348/562; 348/563

[58] Field of Search .................................... 348/553, 461, 348/464, 465, 468, 473, 474, 476, 478, 563, 567, 569, 570, 906; H04N 7/00

[56] References Cited

U.S. PATENT DOCUMENTS

| | | | |
|---|---|---|---|
| 4,205,343 | 5/1980 | Barrett | 348/468 |
| 5,488,426 | 1/1996 | Pack | 348/569 |
| 5,526,427 | 6/1996 | Thomas et al. | 348/461 |
| 5,617,146 | 4/1997 | Duffield et al. | 348/473 |
| 5,631,707 | 5/1997 | D'Errico | 348/473 |
| 5,652,628 | 7/1997 | Toyoshima et al. | 348/563 |
| 5,661,526 | 8/1997 | Hamamoto et al. | 348/906 |

FOREIGN PATENT DOCUMENTS 0 300 562A 1/1989 European Pat. Off. .

OTHER PUBLICATIONS

IEEE Transactions On Consumer Electronics, vol. 37, No. 4, Nov. 1, 1991, pp. 737–745, XP000275983 Wilson E.J.: "Programme Delivery Control for SImplified Home Video Recording" p. 740, column 1, line 34, p. 742.

*Primary Examiner*—John K. Peng
*Assistant Examiner*—Linus H. Lo
*Attorney, Agent, or Firm*—Frommer Lawrence & Haug LLP; William S. Frommer

[57] ABSTRACT

When the time is to be set to a clock in a video tape recorder (VTR) utilizing time information that is interpolated in a broadcasting signal, a broadcasting station for this time setting can easily be selected by using broadcasting station tables containing identification codes of broadcasting stations which transmit time information of the areas (countries) separately for each area. A microprocessor in the VTR successively searches broadcasting stations and selects the broadcasting station which has the broadcasting station identification code contained in its broadcasting station tables in VPS or Teletext as the broadcasting station desired for time setting. Not only are the broadcasting station identification codes to be stored in memory but also a priority order may be stored in the broadcasting tables to enable the selection of a broadcasting station having the highest priority from among the received broadcasting station identification codes as the determined broadcasting station for time setting.

4 Claims, 13 Drawing Sheets

| AREA : UNITED KINGDOM | |
|---|---|
| BROADCASTING STATION IDENTIFICATION CODE | PRIORITY ORDER |
| FA6F | 2 |
| A2FE | 3 |
| C8DE | 1 |
| FCD1 | 4 |

| AREA : FINLAND | |
|---|---|
| BROADCASTING STATION IDENTIFICATION CODE | PRIORITY ORDER |
| 2601 | 1 |
| 2602 | 2 |
| | |
| | |

| AREA : NORTH EUROPE | |
|---|---|
| BROADCASTING STATION IDENTIFICATION CODE | PRIORITY ORDER |
| 4701 | 2 |
| 4601 | 3 |
| 4602 | 1 |
| | |

FIG. 3

| AREA : UNITED KINGDOM |
|---|
| BROADCASTING STATION IDENTIFICATION CODE |
| FA6F |
| A2FE |
| C8DE |
| FCD1 |

| AREA : FINLAND |
|---|
| BROADCASTING STATION IDENTIFICATION CODE |
| 2601 |
| 2602 |

| AREA : NORTH EUROPE |
|---|
| BROADCASTING STATION IDENTIFICATION CODE |
| 4701 |
| 4601 |
| 4602 |

F I G. 4A
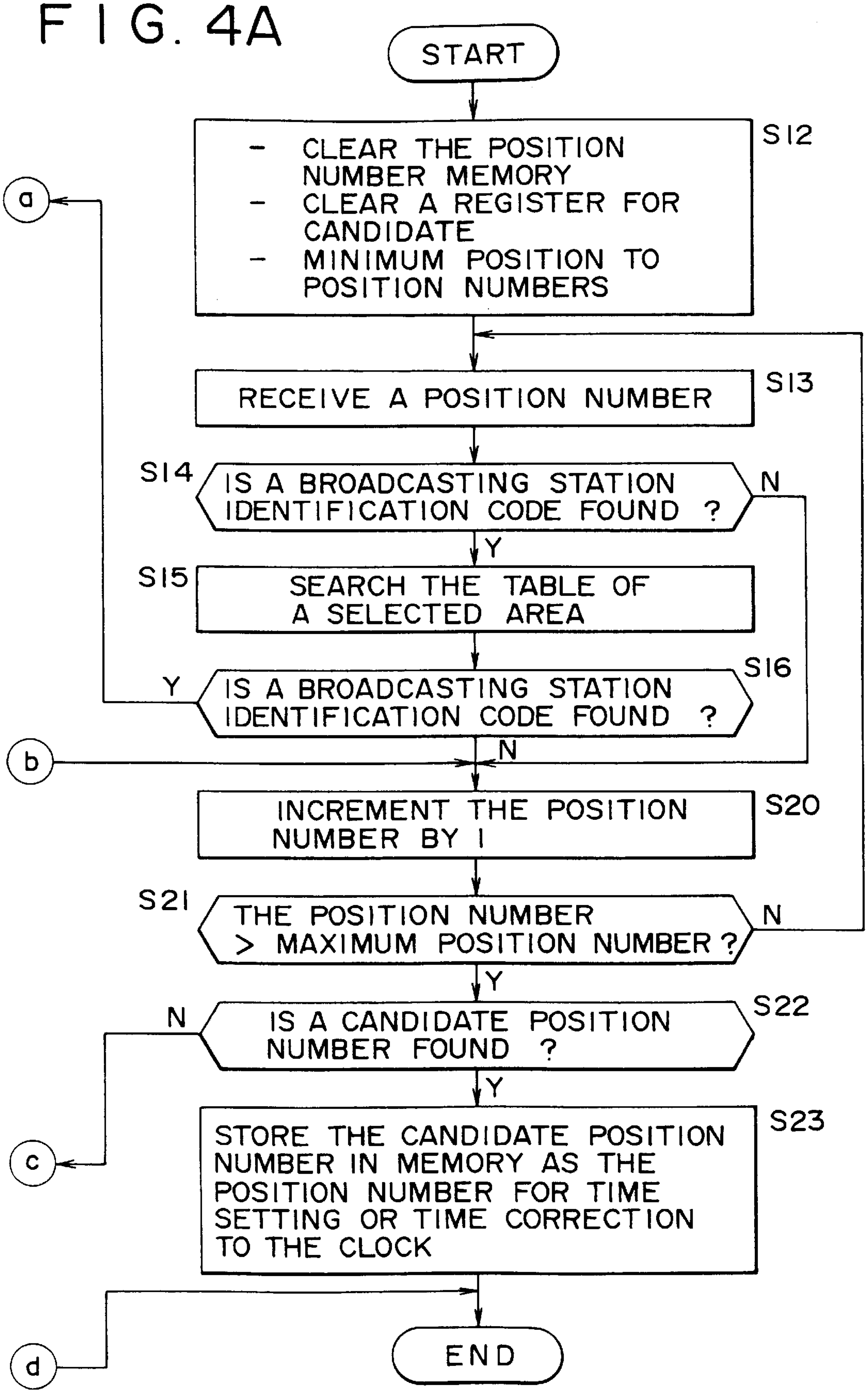

FIG. 5

| AREA : UNITED KINGDOM | |
|---|---|
| BROADCASTING STATION IDENTIFICATION CODE | PRIORITY ORDER |
| FA6F | 2 |
| A2FE | 3 |
| C8DE | 1 |
| FCD1 | 4 |

| AREA : FINLAND | |
|---|---|
| BROADCASTING STATION IDENTIFICATION CODE | PRIORITY ORDER |
| 2601 | 1 |
| 2602 | 2 |
| | |
| | |

| AREA : NORTH EUROPE | |
|---|---|
| BROADCASTING STATION IDENTIFICATION CODE | PRIORITY ORDER |
| 4701 | 2 |
| 4601 | 3 |
| 4602 | 1 |
| | |

CNI : COUNTRY AND NETWORK IDENTIFICATION
PIL : PROGRAM IDENTIFICATION LABEL
PTY : PROGRAM TYPE

[VPS]

NI : NETWORK IDENTIFICATION
LTO : LOCAL TIME OFFSET
MJD : MODIFIED JULIAN DATE
UTC : UNIVERSAL TIME CO-ORDINATED ( 8/30/FORMAT 1 )

[ PAGE - HEADER FORMAT ]

TELEVISION DEVICE

BACKGROUND OF THE INVENTION

1. Field of the Invention

This invention relates to a television device having a clock and particularly to television device which is possible to set the clock to the time using chronometry information contained in television broadcasting signals.

2. Description of Related Art

Many clocks are provided in devices in a television to provide various conveniences in the use of a television. One example of such a convenience includes an advanced recording reservation system of a video tape recorder. A clock is provided in a video tape recorder, when a user wants to record by advanced reservation the user feeds data of a channel which will broadcast a television program to be recorded and data of time when the program will start and end previously in the video tape recorder, then, the video tape recorder will automatically record the reserved television program beginning from the start of the program to the end of the program based on chronometry by the clock. Some video tape recorders are structured so that regeneration operation starts automatically at the time of advanced starting reservation and stops automatically at the time of advanced stopping reservation.

In European television broadcasting, a broadcasting service, in which the starting time of a television program is interpolated in vertical interval time code as an identification code of a television program (the program identification code is referred to as a label) now being broadcasted, is practically used, and a technology in which the above mentioned label is used for advanced program reservation has been established for recording systems such as video tape recorders. More in detail, the recording system compares a label interpolated in broadcasting signal of a reserved channel with broadcast starting time data out of the advanced program recording reservation data fed by a user including data of the channel to be recorded and data of broadcast starting time data and broadcast ending time data, and then the recording system operates recording while the label agrees with the starting data.

Various broadcasting services, for which these advanced recording reservation technology is acceptable, such as Video Program System (called VPS hereinafter), in which the label is interpolated in the line 16 in a vertical interval time code applied in Germany, Switzerland, and Austria, and Program Delivery Control (called PCD hereinafter), in which a label is transmitted by using packet 8/30/format 2 of Teletext applied in the Netherlands and Dutch using area of Belgium, are practically used.

Here, Teletext is described briefly. In Teletext, data of a magazine is transmitted using packets from 0 through 29. Only magazine number 8 has packets from 0 through 30, the packet 8/30 includes not only the packet 8/30/format 2 but also packet 8/30/format 1, this type of packet is transmitted about every one second interval as service data packet of a broadcasting station. Packet X/O is defined as Page-Header of the Teletext.

For reference, signal formats of VPS, 8/30/format 2, 8/30/format 1, and Page-Header are illustrated in FIG. 8 to FIG. 11. As obvious in these figures, the label information is included in data areas in bytes from eleventh byte to thirteenth byte in the case of VPS, and other data including CNI data that is an identification code of broadcasting area and broadcasting station are transmitted.

The label information is included in data area of bytes from sixteenth byte to twenty-first byte and, the label information and also CNI data same as VPS signal are transmitted in the case of 8/30/format 2. A present time information comprising years, months, days, hours, minutes, and seconds is included in data area of bytes from fifteenth byte to twenty-first byte in the case of 8/30/format 1, and in data area of bytes from thirteenth byte to fourteenth byte NI code that is the identification code of a broadcasting station is included. In many cases for Page-Header, data area of bytes from thirty eighth byte to forty fifth byte includes the present time information comprising hours, minutes, and seconds.

The recording system applied with advanced recording reservation technology utilizing label system as described herein above is provided with a switching system in preparation for troubles such as intermittent transmission of label. In the event that the broadcasting station happens to be involved in a trouble and cannot transmit the label signal, the advanced recording reservation operation of the recording system is switched based on the time of a clock in the recording system by transmitting a prescribed control signal from the broadcasting station so that the recording system records during the period of time from the programmed starting time to the programmed ending time of the television program which had been set by a user.

By the way, to operate accurately a recording based on the time of the clock, as a matter of cause, it is required that the clock is set to the correct time signal. To keep a clock correctly in time, conventionally in the event of failure of power supply or of newly supplying of power to a recording system by putting a power supply plug of the recording system in a socket for commercial power supply, every time it is required to set the clock to the correct time. However, it is troublesome to set a clock to the correct time for users.

To eliminate the troublesome time setting, an automatic time setting method in which present time information included in television broadcasting signals as described in the above mentioned Teletext is utilized has been known.

When a clock incorporated in a television system is set to the correct time automatically as described herein above, it is required to select a broadcasting station which transmits television broadcasting signals interpolated with the correct present time information in the area where the television system is used, and however, it is very difficult to identify such a broadcasting station among many broadcasting stations for general users.

SUMMARY OF THE INVENTION

The present invention provides a television device provided with receiving means for receiving television broadcasting signals, channel selecting means for selecting a television broadcasting signal of a desired broadcasting station from received television broadcasting signals, identification means for identifying broadcasting station-identifying code interpolated in television broadcasting signals, a clock, and command input means for feeding a time setting command to the channel selecting means to set the clock to the correct time, wherein the channel selecting means has memory means having recorded broadcasting station codes corresponding to each broadcasting station respectively which is transmitting broadcasting signals with interpolation of correct time information in the area where the television device is used, and when a time setting command is fed from the command input means, the channel selecting means selects the television broadcasting signal which corresponds to the broadcasting station stored in the memory means out of television broadcasting signals received by the receiving means based on the identification output generated from the identification means.

In the television device described herein above, the television device may be structured so that the memory means stores not only a plurality of broadcasting station codes for identifying a broadcasting station but also priority order of these plurality of broadcasting stations, and when a time setting command is fed from the command input means, the channel selecting means selects the television broadcasting signal that is a television broadcasting signal broadcasted from a broadcasting station stored in the memory means and the broadcasting signal broadcasted from the broadcasting station with the highest priority out of television broadcasting signals received by the receiving means.

It is preferable that any one of CNI data included in VPS signal, NI data included in 8/30/format 1 of Teletext signal, and CNI data included in 8/30/format 2 of Teletext signal is used as a broadcasting station-identification code.

The contents in the memory means in which the code of the broadcasting station transmitting broadcasting signals with interpolation of the time information correct in the area where the television device is used are compared with the broadcasting station-identification code interpolated in the received television broadcasting signal, thereby a broadcasting station which transmits broadcasting signals with interpolation of the correct time information is selected.

The priority order data of the plurality of broadcasting stations stored in the memory means is stored in the memory means, and the broadcasting station with the highest priority is selected out of broadcasting stations which transmit broadcasting signals with interpolation of the received correct time information.

BRIEF DESCRIPTION OF DRAWINGS

FIG. 3 is an one example of data content of broadcasting stations in the embodiment.

FIG. 5 is another example of data content of broadcasting stations in the embodiment.

DETAILED DESCRIPTION OF THE PREFERRED EMBODIMENTS

Figure 1:
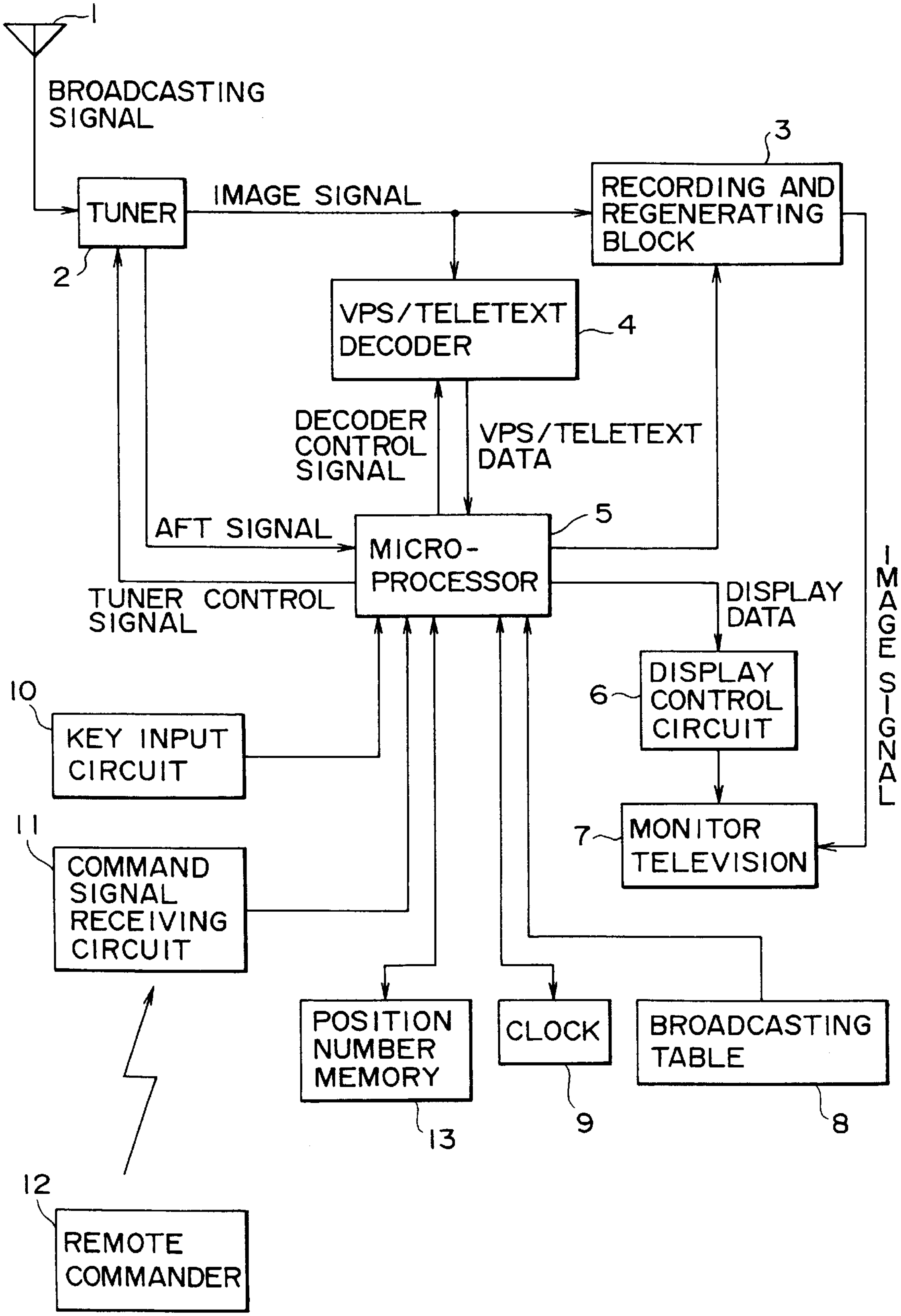
FIG. 1 is a circuit block diagram for illustrating an embodiment of a television device in accordance with the present invention.

The first embodiment of a television device in accordance with the present invention is shown in FIG. 1. In this embodiment, broadcasting signals are received by an antenna 1 and fed to a tuner 2 to select signals of a desired broadcasting station, and an image signal, which is a demodulated output of the received broadcasting signal, is fed to a recording and regenerating block 3 for recording, an image signal regenerated in the recording and regenerating block 3 is fed to a monitor television 7 for displaying a picture, or an image signal from the tuner 2 is fed to the monitor television 7 without passing through a recording and regenerating circuit in the recording and regenerating block for displaying a picture, a microprocessor 5 controls the whole system.

A clock 9 in this embodiment is provided to control the recording operation and the regeneration operation in the recording and regenerating block 3 and the displaying operation in the monitor television 7 depending on time, and to display the time for convenience of users, the time of the clock 9 is set automatically using the present time information included in Teletext.

Next, the operation for determining a broadcasting station which transmits correct present time information used for time setting is described in detail.

First, a user transmits a menu displaying command to the television device of the embodiment using a remote commander 12. The microprocessor 5 receives the command from a command signal receiving circuit 11, then, fed menu display data to a display control circuit 6. The display control circuit 6 converts this data to a video signal and fed it to the monitor television 7, and consequently a menu picture is displayed. The user selects the area (country) selection menu from the displayed menu, and select the area (country) where the user lives and thus the selected area (country) is stored in the microprocessor.

Next, the user displays the menu picture on the monitor television 7 again using the remote commander 12, and selects the menu for determining a broadcasting station which is transmitting present time information to be used for time setting. Thereby, the microprocessor 5 determines a broadcasting station according to a flowchart shown in FIG. 2. In detail, the microprocessor 5 clears at first a position number memory 13 comprising nonvolatile memory provided externally on the microprocessor, and sets the minimum position number in the memory (steps S1 and S2), and sends a tuner control signal to the tuner while reading AFT signal from the tuner 2 so as to select this position number (step S3).

After completion of channel selection, an image signal generated from the tuner is fed to a decoder 4 of VPS or Teletext, the obtained decoder output is checked (step 4) to find CNI data which is the identification code of broadcasting stations in VPS or 8/30/format 2 as described hereinbefore or NI data which is the identification code of broadcasting station in 8/30/format 1.

On the other hand, in a broadcasting station table 8 in the television device as shown in FIG. 3, for example, broadcasting station codes (the above mentioned CNI data or NI data is used as the broadcasting station code as they are) representing broadcasting stations which are transmitting the correct present time information using Teletext are stored in the memory by area, the microprocessor 5 searches (step S5) the broadcasting station table of the area selected and stored using the above mentioned menu when the resultant judgment is YES in the step S4 to find (step S6) the identification code of the broadcasting station found in the step S4.

When the identification code is found in the table, a position number is determined to be the position number used for time setting to the clock (step S7). On the other hand when the resultant judgment is NO in the step S6, the position number in the position number memory is increased by one (step S8), then the process returns to the step S3 through the step S9. When the resultant judgment is NO in the step S4, the process returns to the step S3 through the same way. By repeating this loop circulation, the broadcasting station with the minimum position number is detected as the position number for time setting out of broadcasting stations which transmit the present time information ranging from the minimum position number to the maximum position number.

For example when the power supply of the picture recorder is turned off and turned on again then the user wants to set the time, the user selects the menu of time setting to the clock on the menu picture using the remote commander, then, the microprocessor feeds a tuner control signal to the tuner so that the position number stored in the nonvolatile position number memory is selected, and sets the time to the clock 9 based on the present time information from the decoder obtained at the position number.

The device may be structured so that a switch-on operation of power supply to the picture recorder is detected by the microprocessor, thereby, every time when a power supply is turned on to the picture recorder, the microprocessor sets the time automatically based on the detection output without command of time setting by the user.

In the case that such structure is employed, a notice will be necessary to let users know that when the picture recorder is used first time in the area where the picture recorder is installed the user must do at the first place the operation to determine a broadcasting station for time setting. Thereby, the microprocessor will not automatically set the time mistakingly using the position number (broadcasting station) stored in the position number memory when setting time in an area where the picture recorder is used before.

If the above mentioned loop detecting operation up to the maximum position number cannot find an identification code of a broadcasting station in the step S6, the fact that a position number usable for time setting is not found is stored in the memory (step S10). As a practical method, a special code, for example which is abnormal as a usual position number, may be included in the position number memory. When a user give a command for time setting to the clock, the microprocessor comes to a recognition of no position number for time setting by detecting that the data contained in the position number memory is the special code, and the microprocessor displays to the user that the automatic time setting to the clock is impossible.

In this embodiment, the above mentioned CNI code or NI code is written in the broadcasting station table 8 as the broadcasting station code, and however, a special code which is converted from CNI code or NI code according to a certain prescribed regulation may be written.

In respect of writing order of the broadcasting station codes on broadcasting tables of each area, position numbers of the broadcasting stations may be written in descending order or ascending order to sort rapidly codes in the broadcasting station tables in the step S5 and step S6. Broadcasting station codes may be written in the priority order when it is desired that the priority order is given to the broadcasting station code which is written in broadcasting station tables.

Next, the second embodiment, in which a plurality of broadcasting stations in the area transmit the present time information and a priority order is given to these broadcasting stations, thus a broadcasting station with the highest priority is selected as the broadcasting station for time setting, is described hereinafter (the priority order may be arranged based on criteria such as the content of the time information, accuracy of the time information, transmission time schedule of the time information, and broadcasting station operators).

Figure 4:
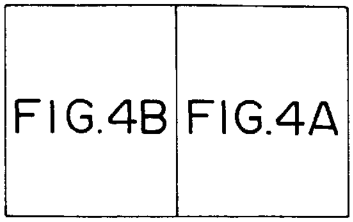
FIG. 4 is a flowchart for determining a broadcasting station for time setting with the higher priority in the embodiment.
Figure 4B:
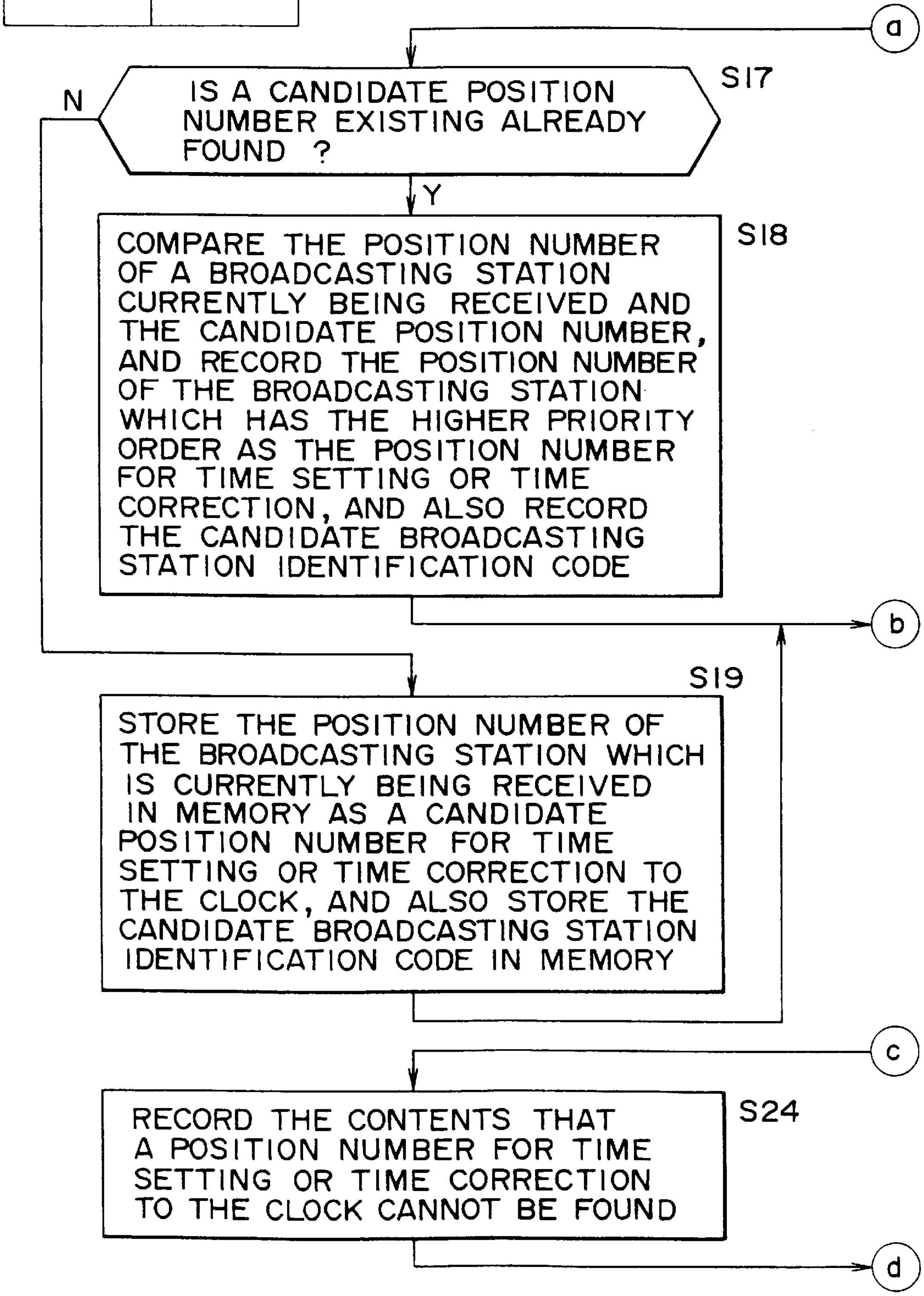

A flowchart for selecting a broadcasting station for time setting applied in this embodiment is shown in FIG. 4, and an example of broadcasting station tables for each area used for this embodiment is shown in FIG. 5. In this broadcasting station tables broadcasting station codes and priorities are written as it is obvious in the figure, and in this example, the order of broadcasting stations in these tables is arranged in the ascending order of the position numbers of the broadcasting stations so that the searching operation in the step S15 in FIG. 4 is performed quickly. The whole structure of this embodiment is the same as shown in FIG. 1 excepting that a register for a candidate broadcasting station for storing a broadcasting station and its position number which are used as a candidate broadcasting station for time setting is provided in the microprocessor differently from the first embodiment.

Figure 2:
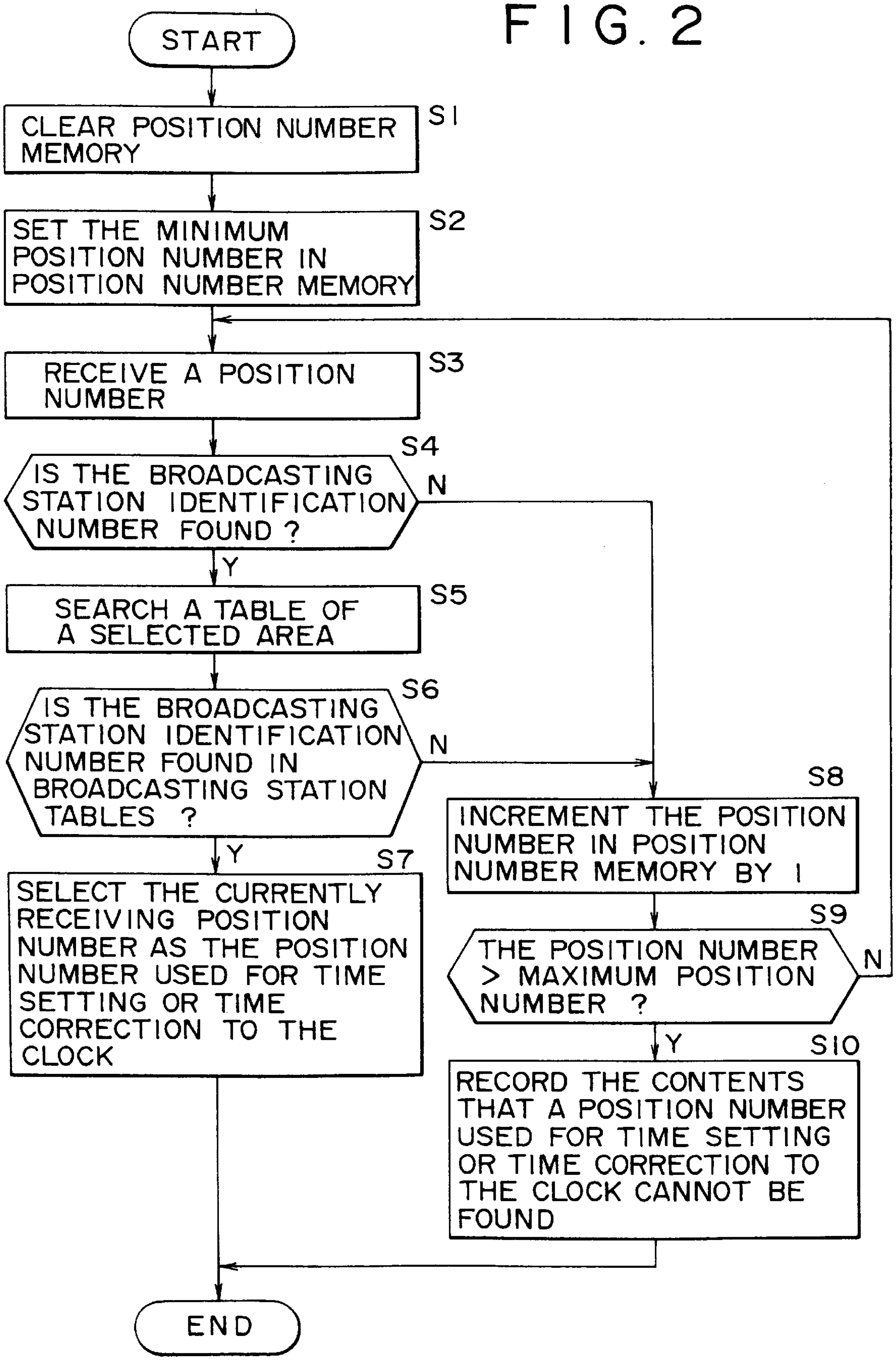
FIG. 2 is a flowchart for determining a broadcasting station for setting a clock to the time of the embodiment.

Next, in respect of the flow shown in FIG. 4, the processes from the step S12 to step S16 are the same as the step S1 to step S6 shown in FIG. 2 excepting that the register for a candidate is cleared in FIG. 4 differently from FIG. 2. When the judgment in the step S16 is YES, whether a candidate position number for time setting exists already in the register for candidate is checked (step S17), and if the candidate does not exist, the current position number and that broadcasting station are stored in the register for candidate as a candidate for time setting (step S19), subsequently, the process returns to the step S13 through the increment operation of the position number memory content in the step S20 and the judgment processing in the step S21.

When the judgment in the step S17 is YES, the priority of the current broadcasting station and the candidate broadcasting station is compared, and the broadcasting station with higher priority and the position number thereof are stored (step S18), then, the process moves to the step S20. By repeating the loop operation comprising the steps from step S13 to step S21 beginning from the minimum position to the maximum position, finally, a broadcasting station which is transmitting a broadcasting station code and the present time information and has the highest priority among broadcasting stations having position numbers from the minimum position number to the maximum position number is stored in the register for candidate as the candidate broadcasting station for time setting.

If the position number of the candidate is contained in the register for candidate at the time point when the repeated operations of the loop is completed, this candidate position number is stored in the position number memory 13 as the position number for time setting (step S23). On the other hand, if a candidate position number is not found during the repeated operations of the loop up to the maximum position number, the result that there is no broadcasting station for time setting is stored (step S24) in the same manner as described in the first embodiment.

Two embodiments described herein above involve a television system which is structured so that a broadcasting station is selected utilizing position number, but in the next, an embodiment which involves a television system structured so that a broadcasting station is selected utilizing channel number. In the third embodiment, a flowchart for selecting a broadcasting station for time setting without providing a priority order to broadcasting stations in the same manner as described for FIG. 2 is shown in FIG. 6.

Two differences of this embodiment from the embodiment in FIG. 2 are described in the following.

(1) A channel number memory is used in this embodiment in stead of the position number memory 13 for successive selection operations in the order of channel number.

Figure 6:
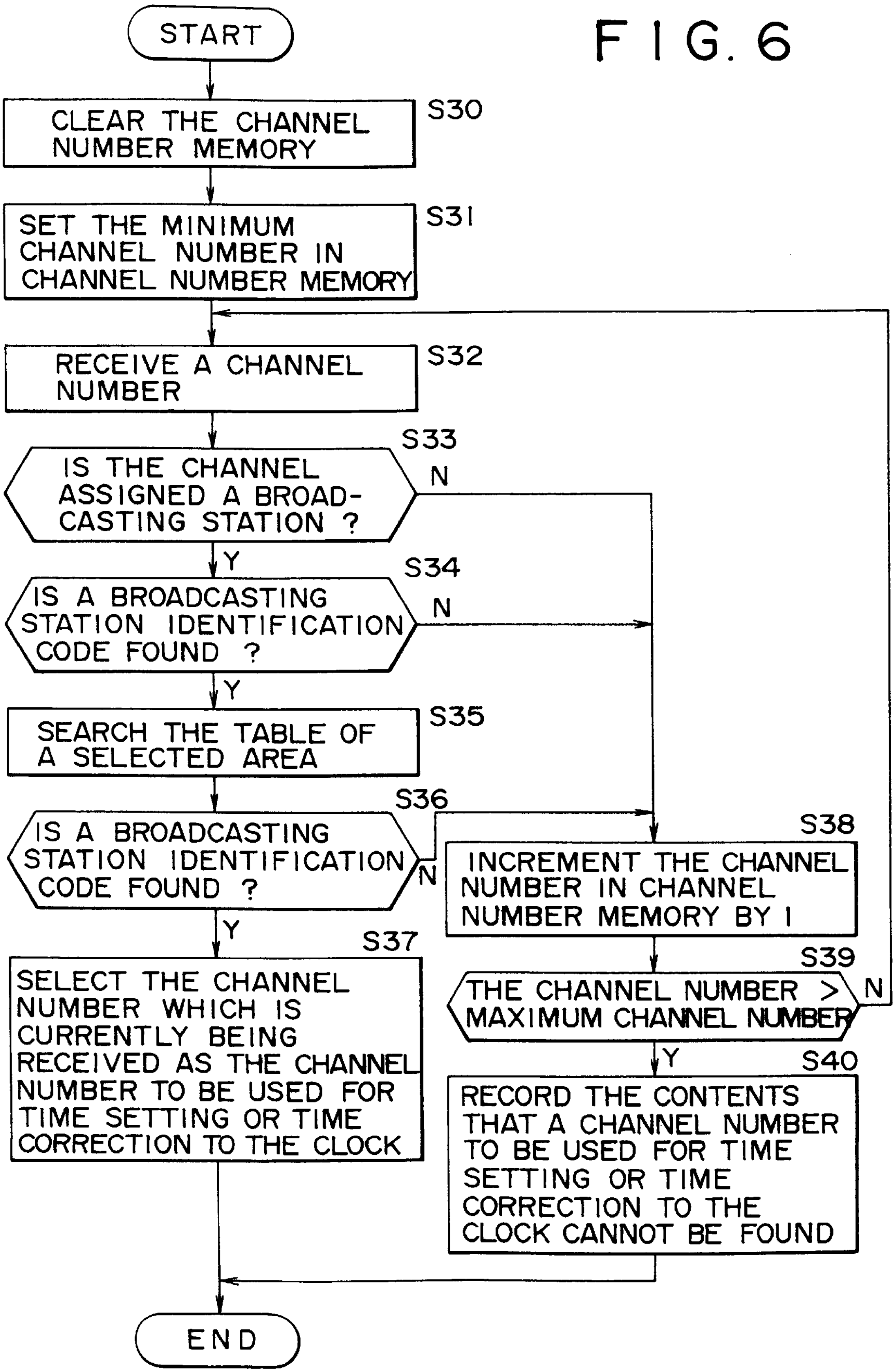
FIG. 6 is a flowchart for determining a broadcasting station for time setting according to channel number in the embodiment.

(2) An additional step S34 is provided for checking whether broadcasting is operated for the received channel when the channel is received in the step S32 in FIG. 6 because there are channels for which a broadcasting station is not assigned among all involving channels, and only for broadcasting channels the step S34 checks the broadcasting station identification code.

Figure 7:
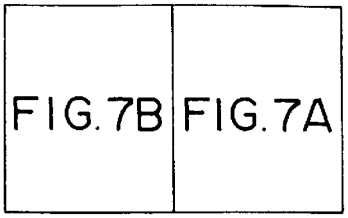
FIG. 7 is a flowchart for determining a broadcasting station for time setting with the higher priority according to channel number in the embodiment.
Figure 7B:
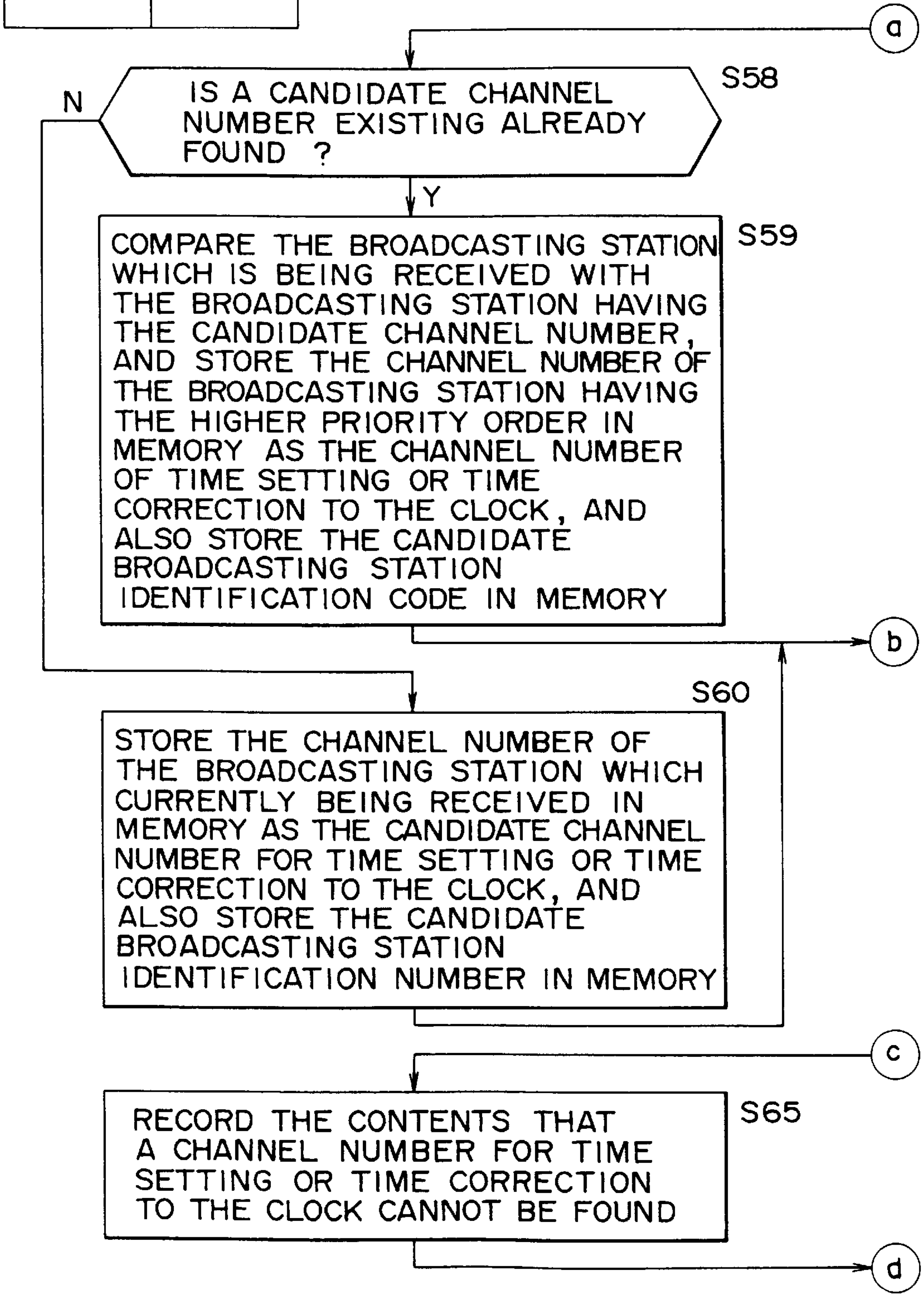
Figure 7A:
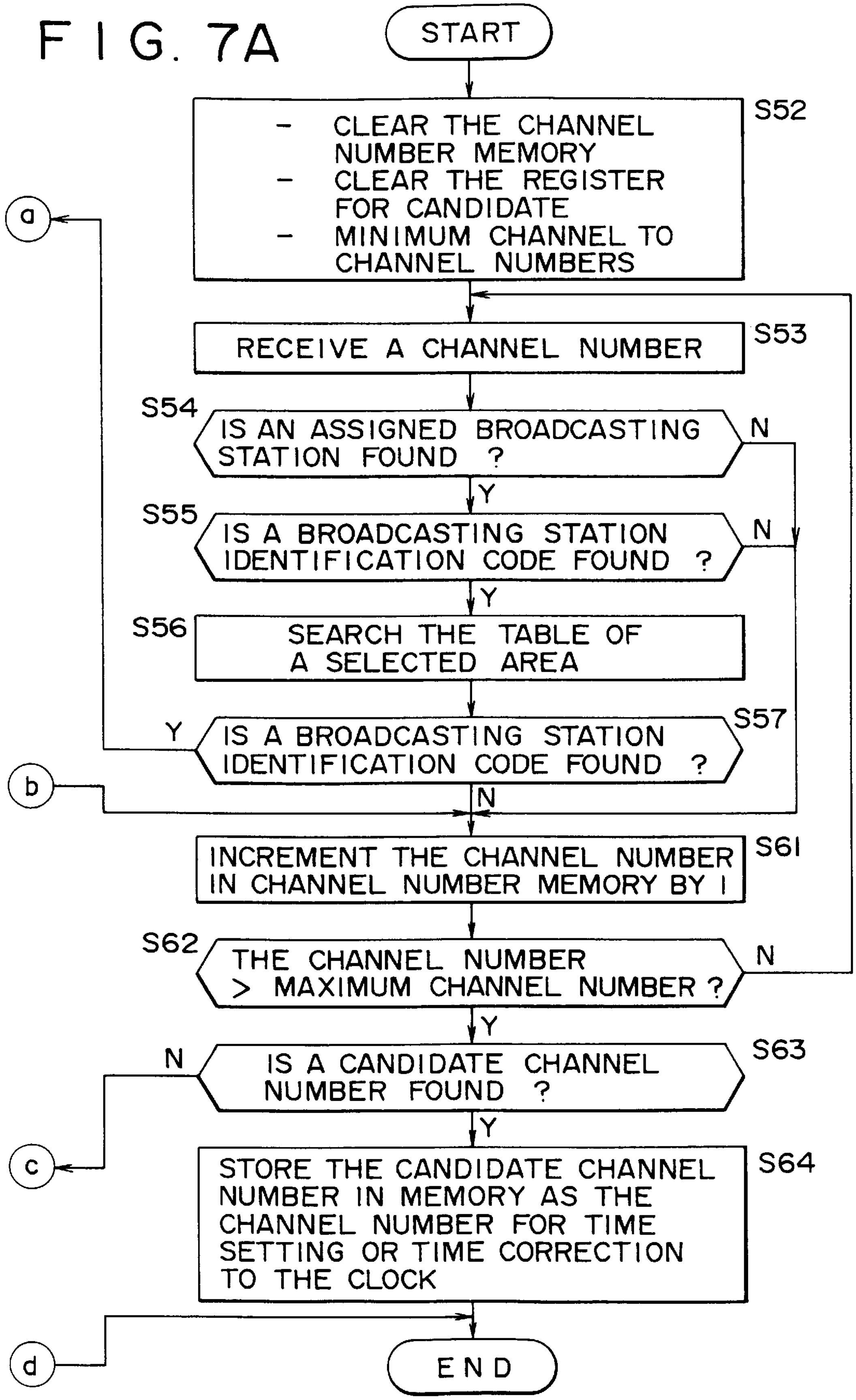
Figure 8:
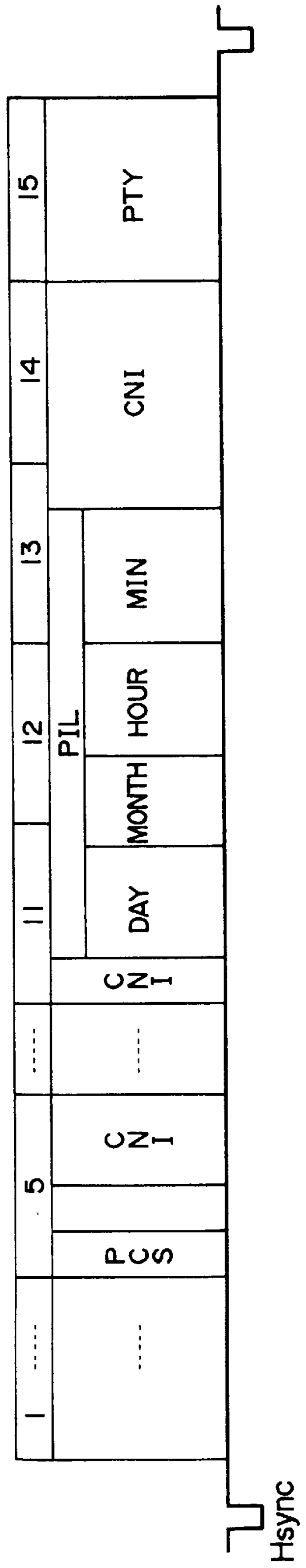
FIG. 8 is a signal format of VPS.
Figure 9:
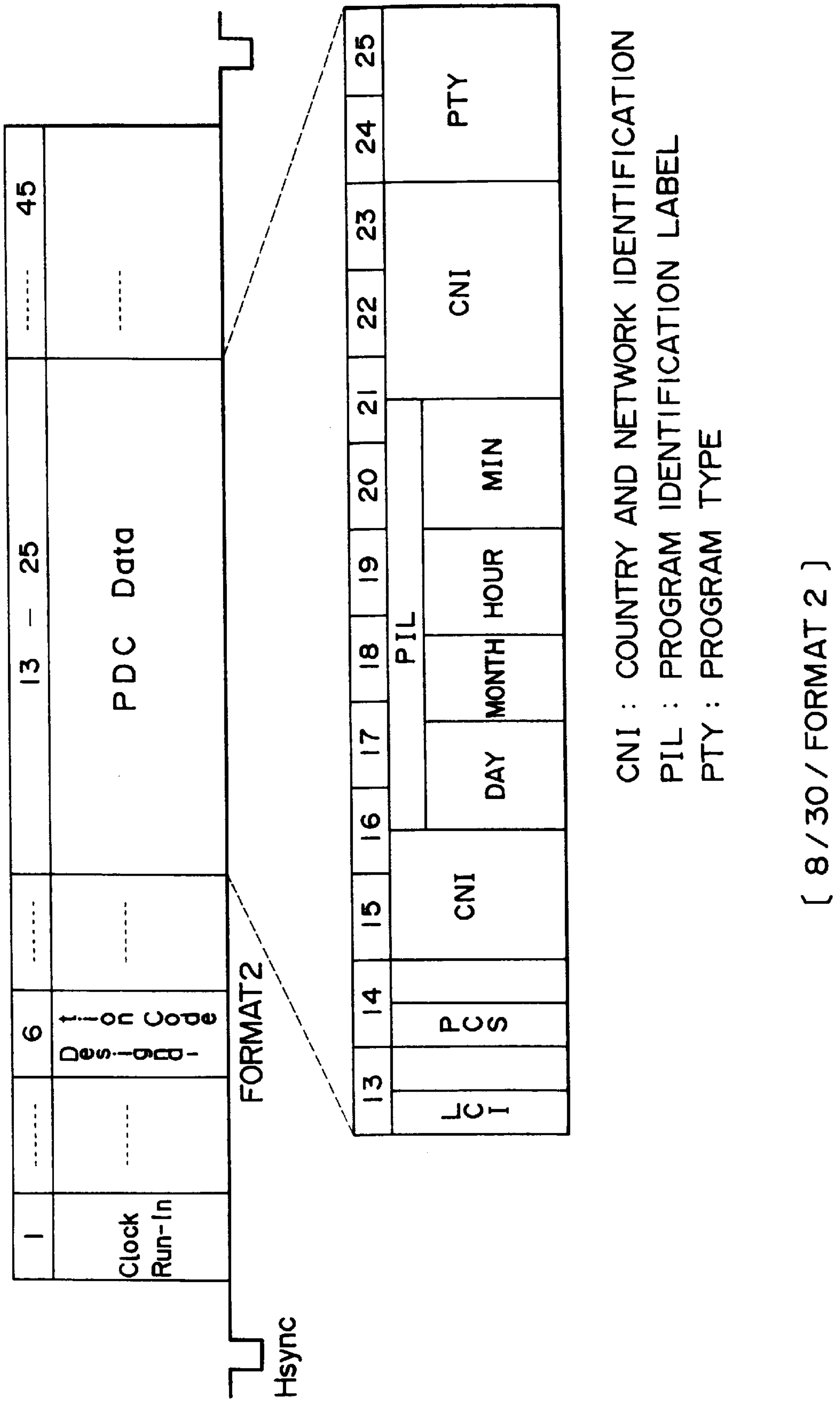
FIG. 9 is a signal format of 8/30/format 2.
Figure 10:
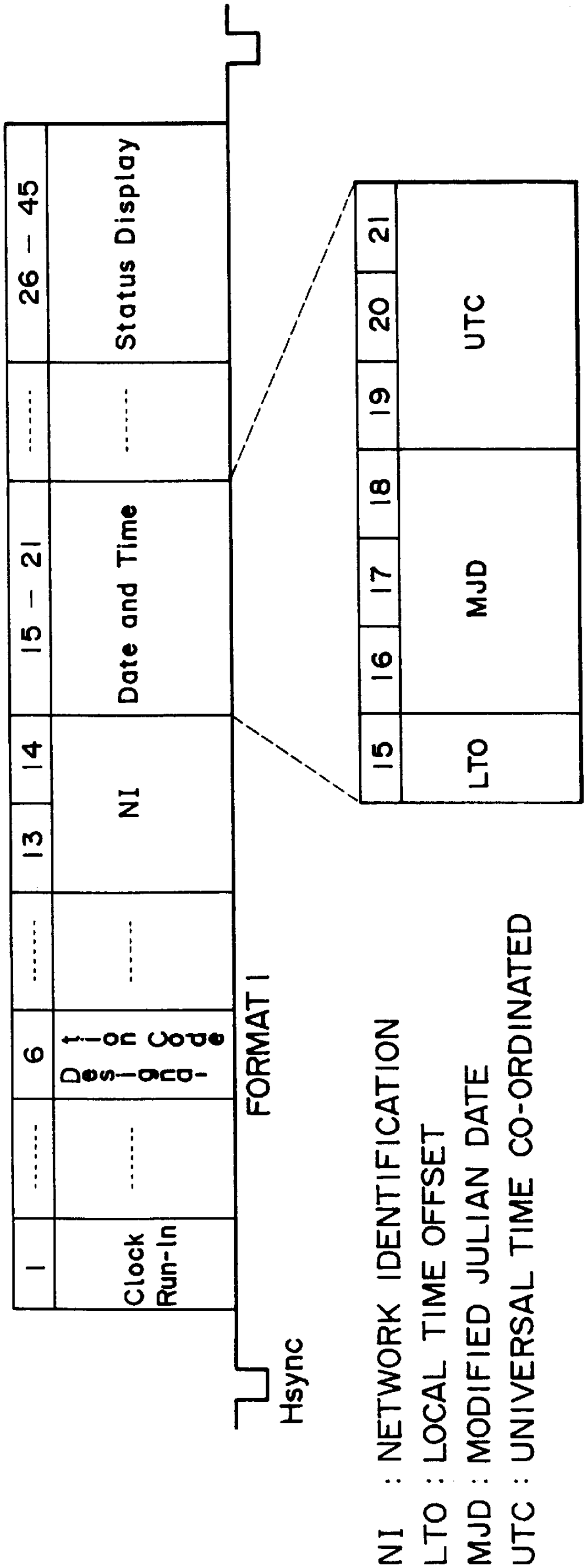
FIG. 10 is a signal format of 8/30/format 1.
Figure 11:
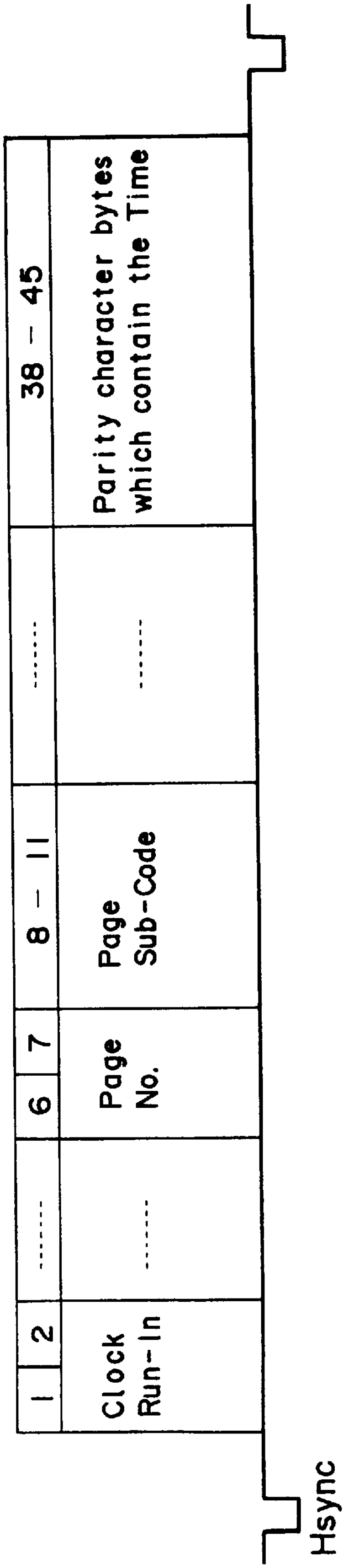
FIG. 11 is a signal format of Page-Header.

A flowchart of a case, in which priority order is given to a plurality of broadcasting stations transmitting the present time information, and a television system structured so that a broadcasting station with higher priority is selected as the broadcasting station for time setting is used, thus the selection is operated utilizing the channel number similarly as FIG. 4, is shown in FIG. 7. The difference of this embodiment from that shown in FIG. 4 is the same as (1) and (2) described herein above.

Without a special knowledge, users can have a convenience of correct time setting because the television system selects automatically a broadcasting station which transmits television broadcasting signal with interpolation of correct time information for the area where the television system is used.

In the case in which a plurality of broadcasting station transmit television broadcasting signal with interpolation of correct time information for the area where the television system is used, the most preferable broadcasting station is automatically selected.

What is claimed is:

1. A television device provided with;

(1) receiving means for receiving television broadcasting signals, (2) channel selecting means for selecting a television broadcasting signal of a desired broadcasting station from received television broadcasting signals, (3) identification means for identifying broadcasting station-identifying code interpolated in television broadcasting signals, (4) a clock, and (5) command input means for feeding a time setting command to said channel selecting means to set said clock to the correct time, wherein said channel selecting means has memory means having recorded broadcasting station codes corresponding to each broadcasting station respectively which is transmitting broadcasting signals with interpolation of correct time information in the area where said television device is used, and when a time setting command is fed from said command input means, said channel selecting means selects the television broadcasting signal which corresponds to the broadcasting station stored in said memory means out of television broadcasting signals received by said receiving means based on the identification output generated from said identification means wherein said memory means stores a plurality of broadcasting station codes for identifying said broadcasting stations and also a priority order of said broadcasting stations determined by one of the following criteria: content of time information, accuracy of the time information, transmission time schedule of the time information, and broadcasting station operations; and when said time setting command is fed from said command input means, said channel selecting means automatically selects the television broadcasting signal broadcasted from the broadcasting station having the highest priority.

2. A television device as claimed in claim 1, wherein any one data of CNI data included in VPS signal, NI data included in 8/30/format 1 of Teletext signal, and CNI data included in 8/30/format 2 of Teletext signal is used as a broadcasting station-identification code.

3. A television device as claimed in claim 1, wherein any one data of CNI data included in VPS signal, NI data included in 8/30/format 1 of Teletext signal, and CNI data included in 8/30/format 2 of Teletext signal is used as a broadcasting station-identification code.

4. A television device provided with;

(1) receiving means for receiving television broadcasting signals, (2) channel selecting means for selecting a television broadcasting signal of a desired broadcasting station from received television broadcasting signals, (3) identification means for identifying broadcasting station-identifying code interpolated in television broadcasting signals, (4) a clock, and (5) command input means for feeding a time setting command to said channel selecting means to set said clock to the correct time, wherein said channel selecting means has memory means having recorded broadcasting station codes corresponding to each broadcasting station respectively which is transmitting broadcasting signals with interpolation of correct time information in the area where said television device is used, and when a time setting command is fed from said command input means, said channel selecting means selects the television broadcasting signal which corresponds to the broadcasting station stored in said memory means out of television broadcasting signals received by said receiving means based on the identification output generated from said identification means wherein said memory means stores a plurality of broadcasting station codes for identifying said broadcasting stations and also a priority order of said broadcasting stations, and when said time setting command is fed from said command input means, said channel selecting means automatically selects the television broadcasting signal broadcasted from the broadcasting station having the highest priority.

* * * * *